(12) United States Patent
Raines et al.

(10) Patent No.: US 9,156,408 B1
(45) Date of Patent: Oct. 13, 2015

(54) ACTIVE GLOVE BOX DOOR WITH REACTION SURFACE CATCHER

(71) Applicant: Ford Global Technologies, LLC, Dearborn, MI (US)

(72) Inventors: Stacey H. Raines, Ypsilanti, MI (US); Sean B. West, Monroe, MI (US); Thomas W. Pietila, Brighton, MI (US); Anthony Ligi, Jr., Chelsea, MI (US); Edward J. Abramoski, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 89 days.

(21) Appl. No.: 14/288,598

(22) Filed: May 28, 2014

(51) Int. Cl.
*B60R 21/045* (2006.01)
*B60R 21/206* (2011.01)
*B60R 7/06* (2006.01)
*B60R 21/04* (2006.01)

(52) U.S. Cl.
CPC ............... *B60R 7/06* (2013.01); *B60R 21/045* (2013.01); *B60R 21/206* (2013.01); *B60R 2021/0407* (2013.01)

(58) Field of Classification Search
CPC ............... B60R 21/045; B60R 21/206; B60R 21/23169; B60R 7/06; B60R 2021/0407
USPC ........ 280/728.2, 728.3, 730.1, 732, 752, 753; 296/187.05, 187.06
See application file for complete search history.

(56) References Cited

U.S. PATENT DOCUMENTS

| 4,427,215 | A | * | 1/1984 | Weichenrieder et al. | 280/752 |
| 5,071,162 | A | * | 12/1991 | Takagawa | 280/752 |
| 5,190,314 | A | * | 3/1993 | Takasugi | 280/752 |
| 5,230,530 | A | * | 7/1993 | Iriyama et al. | 280/732 |
| 5,312,133 | A | * | 5/1994 | Pietila et al. | 280/752 |
| 5,344,184 | A | * | 9/1994 | Keeler et al. | 280/730.1 |
| 5,413,379 | A | * | 5/1995 | Koma | 280/752 |
| 5,476,283 | A | * | 12/1995 | Elton | 280/753 |
| 5,865,468 | A | * | 2/1999 | Hur | 280/752 |
| 6,039,380 | A | * | 3/2000 | Heilig et al. | 296/70 |
| 6,131,950 | A | * | 10/2000 | Schroter | 280/753 |
| 6,276,713 | B1 | * | 8/2001 | Duletzke | 280/732 |
| 6,302,437 | B1 | | 10/2001 | Marriott et al. | |
| 6,431,600 | B1 | * | 8/2002 | Freisler et al. | 280/751 |
| 6,688,643 | B2 | * | 2/2004 | Schneider | 280/753 |
| 6,712,385 | B2 | * | 3/2004 | Enders | 280/730.1 |
| 6,786,524 | B2 | * | 9/2004 | Tamura | 296/37.12 |
| 6,817,627 | B2 | * | 11/2004 | Galmiche et al. | 280/730.1 |
| 6,951,348 | B2 | * | 10/2005 | Enders | 280/728.2 |
| 6,971,667 | B2 | * | 12/2005 | Enders et al. | 280/730.1 |
| 7,261,318 | B2 | * | 8/2007 | Enders | 280/732 |

(Continued)

*Primary Examiner* — Laura Freedman
(74) *Attorney, Agent, or Firm* — Vichit Chea; MacMillan, Sobanski & Todd, LLC

(57) ABSTRACT

An active glove box system comprises an instrument panel and a glove box door. The instrument panel housing defines a door space bordered by a curb flange along top and lateral sides of the door space. The glove box door comprises a trim wall providing an outside trim surface of the door, a bladder wall sealed along an outer edge to the trim wall defining an inflatable cavity, and a reaction wall. The reaction wall defines a back surface of the door, is attached to the bladder wall, and has an outer fringe surface abutting the curb flange when the door is closed. The fringe surface and the curb flange comprise interlocking features configured to engage and disengage in a door opening direction and to provide interference against movement of the reaction wall along an inward perpendicular direction when engaged.

9 Claims, 8 Drawing Sheets

(56) References Cited

U.S. PATENT DOCUMENTS

| | | |
|---|---|---|
| 7,311,328 B2 * | 12/2007 | Best et al. .................... 280/752 |
| 7,322,598 B2 * | 1/2008 | Galmiche et al. .......... 280/730.1 |
| 7,416,212 B2 * | 8/2008 | Iwasaki ........................ 280/752 |
| 7,654,557 B2 * | 2/2010 | Enders ....................... 280/728.2 |
| 7,878,532 B2 * | 2/2011 | Sasaki et al. .............. 280/730.1 |
| 8,096,575 B2 * | 1/2012 | Voyer et al. ............... 280/728.2 |
| 8,146,943 B2 * | 4/2012 | Fukawatase et al. ......... 280/739 |
| 8,205,909 B2 * | 6/2012 | Kalisz .......................... 280/752 |
| 8,215,667 B2 * | 7/2012 | Matsushima .............. 280/730.1 |
| 8,308,186 B1 * | 11/2012 | Orlowsky et al. .......... 280/728.2 |
| 8,308,189 B2 | 11/2012 | Matsushima et al. |
| 8,408,589 B2 | 4/2013 | Fukawatase et al. |
| 8,414,024 B1 * | 4/2013 | Kalisz et al. .................. 280/753 |
| 8,459,689 B2 | 6/2013 | Roychoudhury |
| 8,474,868 B2 * | 7/2013 | Kalisz et al. .................. 280/753 |
| 8,485,582 B2 * | 7/2013 | Sakai et al. .................. 296/37.8 |
| 8,544,876 B2 * | 10/2013 | Best et al. ................. 280/730.1 |
| 8,544,880 B2 * | 10/2013 | Sadr et al. ................. 280/730.2 |
| 8,579,325 B2 * | 11/2013 | Roychoudhury ............. 280/752 |
| 8,596,681 B1 | 12/2013 | Strunk et al. |
| 8,720,943 B1 * | 5/2014 | Mazzocchi et al. ........... 280/739 |
| 2009/0079170 A1 * | 3/2009 | Bito et al. ................. 280/730.1 |
| 2010/0109365 A1 | 5/2010 | Shibata et al. |
| 2011/0198827 A1 * | 8/2011 | Roychoudhury .......... 280/730.2 |

* cited by examiner

ACTIVE GLOVE BOX DOOR WITH REACTION SURFACE CATCHER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster in a glove box door.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall or trim panel that faces a vehicle occupant attached to an inner wall or panel along a sealed periphery. One or both of the walls is deformable in order to provide an inflatable bladder. For example, the inner wall may have a pleated (i.e., accordion-like) region that straightens out during inflation. The walls are initially spaced apart by a small amount when in their pre-deployment, non-inflated condition. This allows ingress of the inflation gas in a manner that can achieve an even inflation across the panel.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation.

When incorporating an active bolster into the door for a glove box or other storage compartment, the inside back wall of the door is required to act as a reaction surface which must be relatively unmovable to that the inflating bladder and the front panel push outward, toward the vehicle occupant (instead of into the storage is compartment). The door typically spans the opening so that the edges of the door overlap with the instrument panel or compartment frame in order to stop the door movement at a closed position.

It is desirable to fabricate the back reaction wall from a moldable thermoplastic for low cost, low weight, and easy attachment to the bladder wall (e.g., by hot plate welding). One potential problem with such a reaction wall is that it may have sufficient flexibility to bend during deployment of the bolster. Particularly during the impact of a passenger against the front panel, the forces against the reaction wall may result in the submarining of the reaction wall through the door opening. The submarining can result in a partial loss of restraint force being applied toward the impacting body.

SUMMARY OF THE INVENTION

In one aspect of the invention, an active glove box system comprises an instrument panel and a glove box door. The instrument panel housing defines a door space bordered by a curb flange along top and lateral sides of the door space. The glove box door comprises a trim wall providing an outside trim surface of the door, a bladder wall sealed along an outer edge to the trim wall defining an inflatable cavity, and a reaction wall. The reaction wall defines a back surface of the door, is attached to the bladder wall, and has an outer fringe surface abutting the curb flange when the door is closed. The fringe surface and the curb flange comprise interlocking features configured to engage and disengage in a door opening direction and to provide interference against movement of the reaction wall along an inward perpendicular direction when engaged.

DETAILED DESCRIPTION OF PREFERRED EMBODIMENTS

Figure 1:
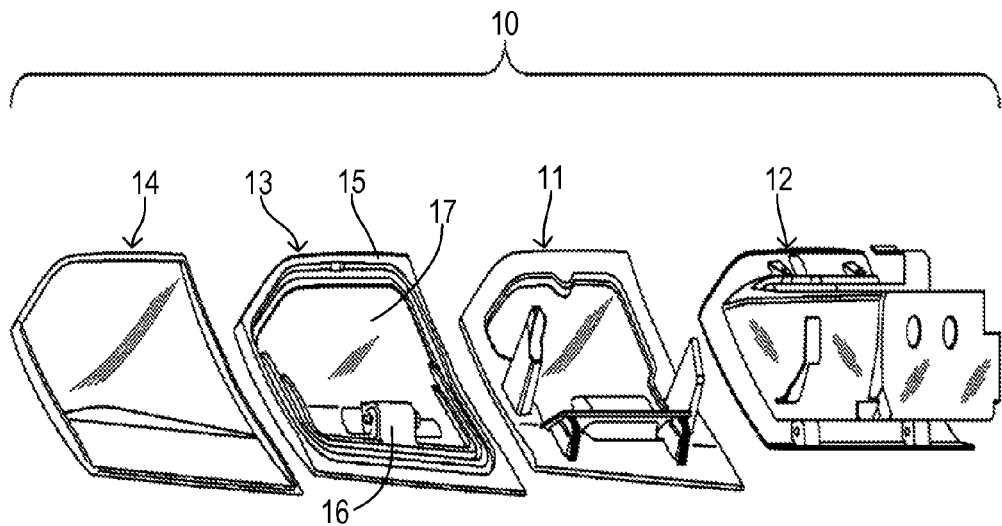
FIG. 1 is an outward-looking, exploded perspective view of a prior art active knee bolster glove box door system of a type to which the present invention can be applied.

Referring now to FIG. 1, a prior art active knee bolster system 10 has a base panel component 11 acting as a reaction wall that forms the support structure or foundation for the bolster. Base 11 is part of a glove box door which is attached to the vehicle by hinging from a storage cavity or glove box 12. The glove box location interfaces to the knees of an individual riding in a corresponding seating position within a vehicle.

Base 11 acts as a reaction surface for supporting an inflatable bladder formed by a bladder wall 13 and an outer trim wall 14 that are joined around their periphery 15. Walls 12, 13, and 14 are preferably comprised of molded plastics (such as thermoplastic polyolefin (TPO)) and are joined by plastic welding, such as hot plate welding. A peripheral seal around a central region 17 of walls 13 and 14 form a cavity of an inflatable bladder. An inflation gas source (i.e., inflator) 16 is electronically controlled for activating during a crash event to release gas to inflate the bolster. Outer wall 14 may comprise the Class A interior trim surface such as the outside of the glove box door, or an additional skin or cover (not shown) can be applied to its outer surface.

Figure 2:
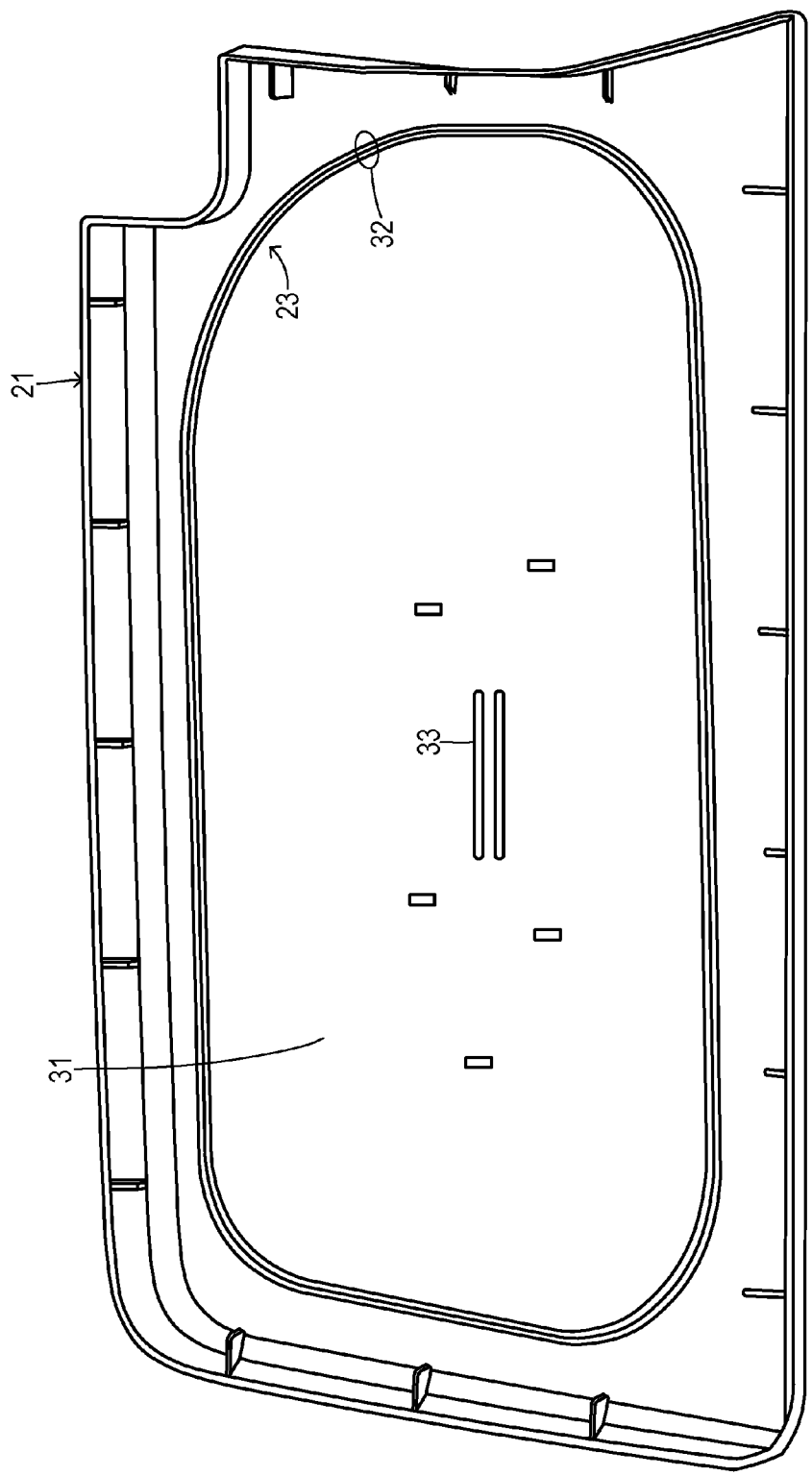
FIG. 2 is a rear perspective view of a prior art outer trim panel for an active glove box door.

FIG. 2 shows an outer trim wall 21 prior to attachment of an inner bladder wall. A bladder surface 31 faces the inner wall when assembled. A plurality of upstanding ribs 32 follow closed perimeter region 23 and are joined a corresponding flange 29 of an inner bladder wall 22 (FIG. 3) by hot welding to create a hermetic seal for the inflatable bladder. Ribs 33 are provided for supporting the inflator.

Figure 3:
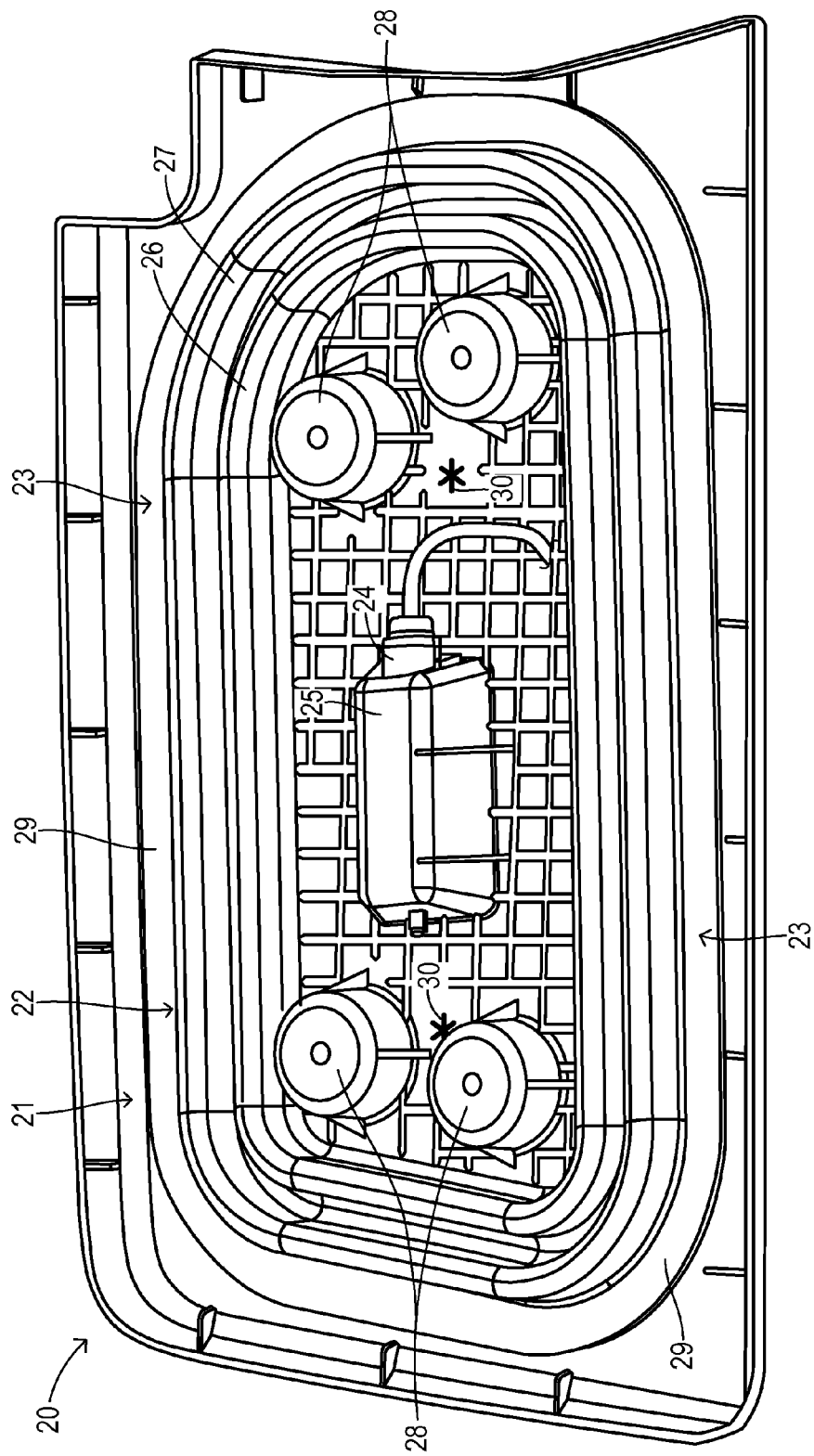
FIG. 3 is a rear perspective view of a bladder wall welded onto the outer trim panel of FIG. 2.

FIG. 3 is a rear view of an inflatable bladder 20 after plastic-molded bladder wall 22 has been joined with plastic-molded trim wall 21. Walls 21 and 22 are joined around a closed perimeter region 23 to form an inflatable bladder having an open central volume between walls 21 and 22 to receive an inflation gas during a crash event from an inflator 24 mounted in a recess 25 of bladder wall 22. Bladder wall 22 includes a plurality of pleats, such as 26 and 27, to accommodate the expansion of is bladder wall 22 during inflation. A plurality of bosses 28 are used to mount bladder wall 22 to a reaction wall (not shown). A welding flange 29 extends circumferentially around bladder wall 22. Vent holes 30 comprised of an asterisk-shaped pattern cut through bladder wall 22 may be included for venting the central volume prior to and during deployment as known in the art.

Figure 4:
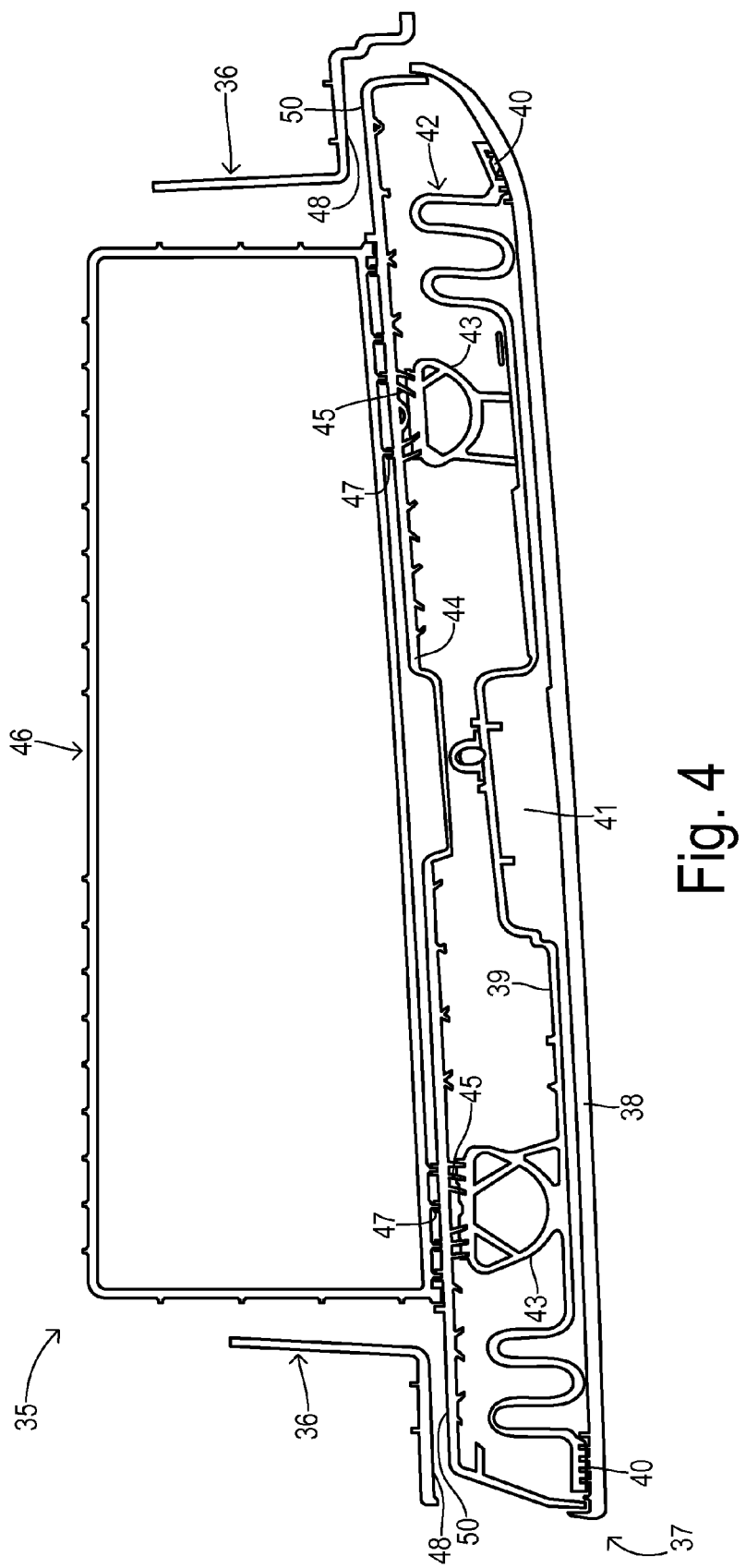
FIG. 4 is a horizontal cross-sectional view of a prior art embodiment of an active glove box system in a pre-deployment condition.
Figure 5:
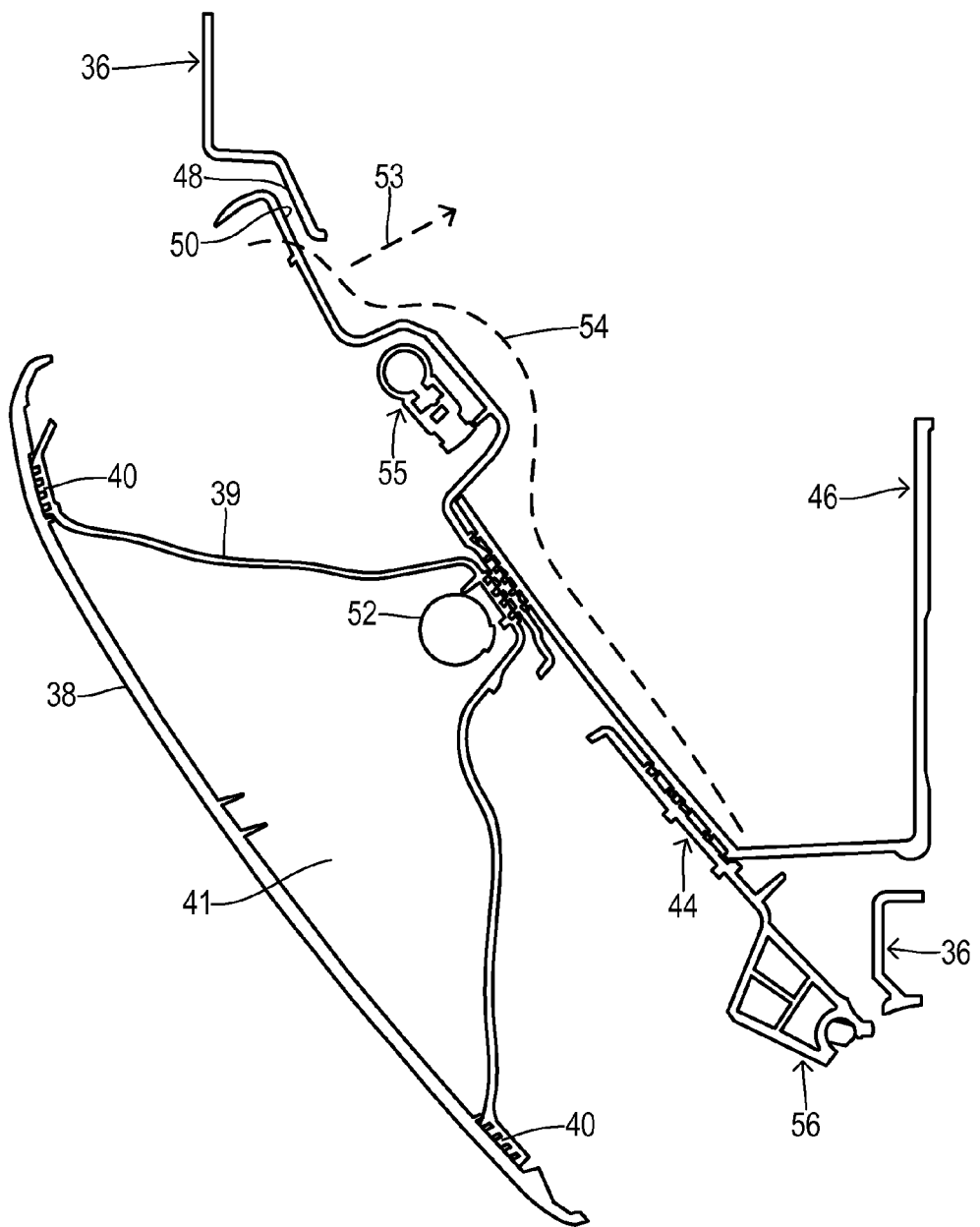
FIG. 5 is a vertical cross-sectional view of the active glove box system of FIG. 4 during inflation.

Referring now to FIGS. 4 and 5, an active glove box system 35 includes a housing 36 which may be formed as a separate surround element (i.e., frame) for mounting to an instrument panel or may be provided directly by a corresponding portion of an instrument panel or dashboard defining a door space for receiving a glove box door 37. Door 37 forms an active knee bolster wherein a front trim wall 38 is attached to a bladder wall 39 along an outer peripheral seal 40 along the outer peripheral edge of walls 38 and 39. An inflatable cavity 41 is formed between walls 38 and 39 which is capable of expansion toward the interior of a passenger compartment and toward an occupant (not shown) of the vehicle by virtue of the unfolding of a plurality of pleats 42 disposed annularly around bladder wall 39 adjacent to peripheral seal 40. Bladder wall 39 includes a plurality of bosses or welding towers 43 which are connected at 45 to a back reaction wall 44, which may be generally cup-shaped for nesting behind trim wall 38 prior to deployment. A storage bin 46 is attached to a back side of reaction wall 44 by a plurality of welds 47. By pivoting door 37 around a hinge 56 at its lower edge, bin 46 is accessed for use as a storage compartment.

To limit the rotation of door 37 when being placed in its closed position, housing 36 includes a curb flange 48 disposed at least along the top and lateral sides of the door opening. Reaction wall 44 has an outer fringe surface 50 which is abuttingly received by curb flange 48 when door 37 is closed.

The interface between curb flange 48 and outer fringe surface 50 is part of the normal functioning of the active knee bolster as a glove box door, so that door 37 can be firmly latched at the closed position using a latch 55. In addition, deployment and impact forces of the active knee bolster are transmitted via the interface between is fringe surface 50 and curb flange 48 when the bolster is inflated during a crash event.

FIG. 5 shows deployment of the active bolster caused by inflating chamber 41 with gas from an inflator 52. Since reaction wall 44 is relatively stable, trim wall 38 moves forward during deployment. Since the preferred material to form reaction wall 44 is a moldable thermoplastic, some bending of reaction wall 44 tends to occur during deployment as shown along dashed line 54. Bulging of reaction wall 44 results in the sliding of outer fringe 50 along the interface with curb flange 48 which can potentially result in submarining along arrow 53. The submarining tends to occur along the lateral sides and top of the door since the bottom hinge tends to help retain the bottom edge.

Figure 6:
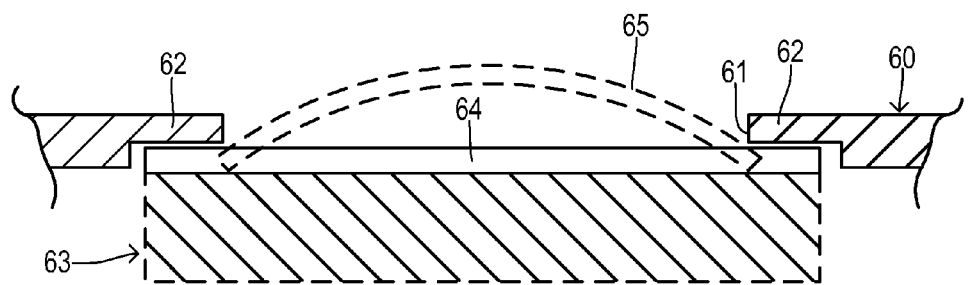
FIG. 6 is a horizontal cross-sectional view of an active glove box system illustrating in phantom lines the submarining of a reaction wall.

Submarining is further illustrated in the horizontal cross section shown in FIG. 6 wherein an instrument panel housing 60 has a door opening 61 inside a curb flange 62. A glove box door 63 includes a reaction wall 64 with its outer edges received by curb flange 62. When door 63 is inflated and then when its outer trim wall is impacted by a passenger, the forces acting on reaction wall 64 may cause it to bulge to a position shown by dashed lines 65. Enlarging the overlap between curb flange 62 and reaction wall 64 could reduce the potential for submarining. For aesthetic and utilitarian purposes, however, the width of the interface between curb flange 62 and the outer fringe of reaction wall 64 needs to be kept relatively small.

Figure 7:
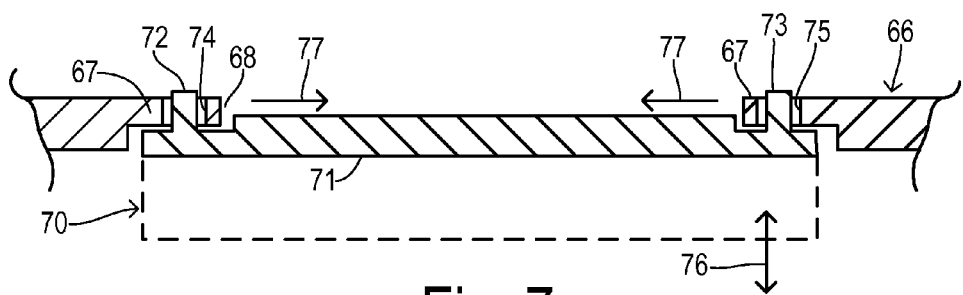
FIG. 7 is horizontal cross-sectional view of a reaction wall and housing having interlocking features of the present invention for inhibiting submarining of the reaction wall.

In order to limit submarining without enlarging the overlap, the present invention employs interlocking features such as shown in FIG. 7. An instrument panel housing 66 has a curb flange 67 defining a door opening space 68. A door system 70 has a reaction wall 71 including a pair of pins 72 and 73 extending rearwardly into matching bores 74 and 75 in curb flange 67. The pins and matching bores create an interlocking feature that engages and disengages in a door opening/closing direction 76. Preferably, the engagement and disengagement in the direction 76 occurs substantially without resistance from the pins entering or leaving the bores. The interlocking feature is configured to provide interference against movement of reaction wall 71 along an inward perpendicular direction 77 that would be associated with the bulging movement. The interlocking pins/bores may preferably be disposed at the lateral sides of the door, along the top of the door, or both. They can also be utilized along the bottom edge of the door if necessary.

Figure 10:
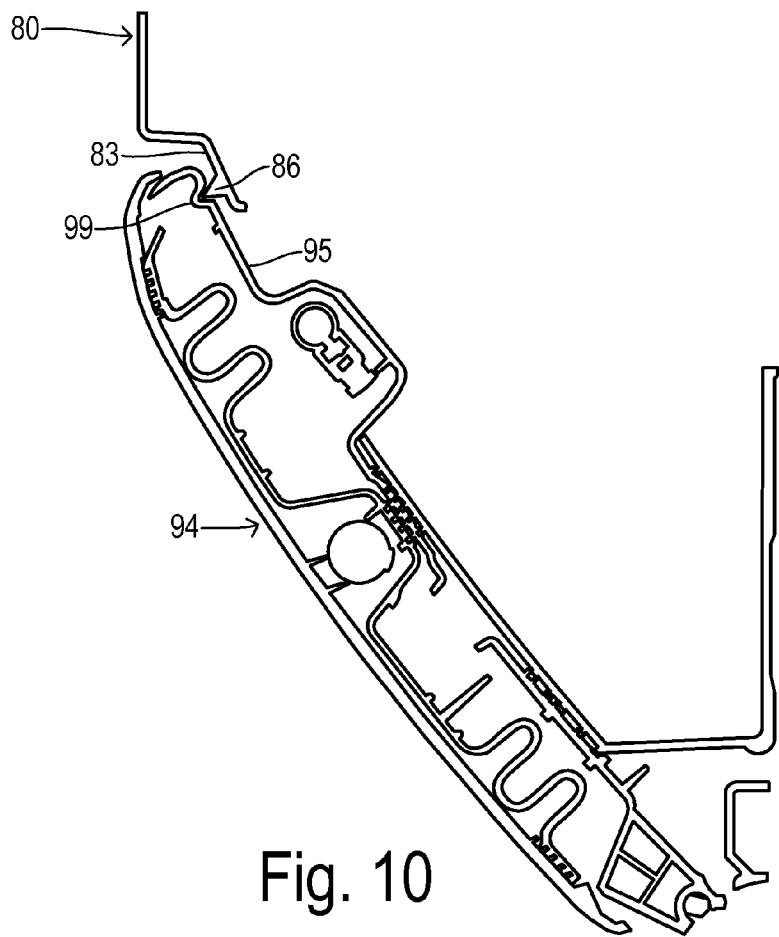
FIG. 10 is a vertical cross-sectional view of the active glove box system of FIG. 9 with interlocking features between the housing and reaction wall at the top of the door opening.
Figure 8:
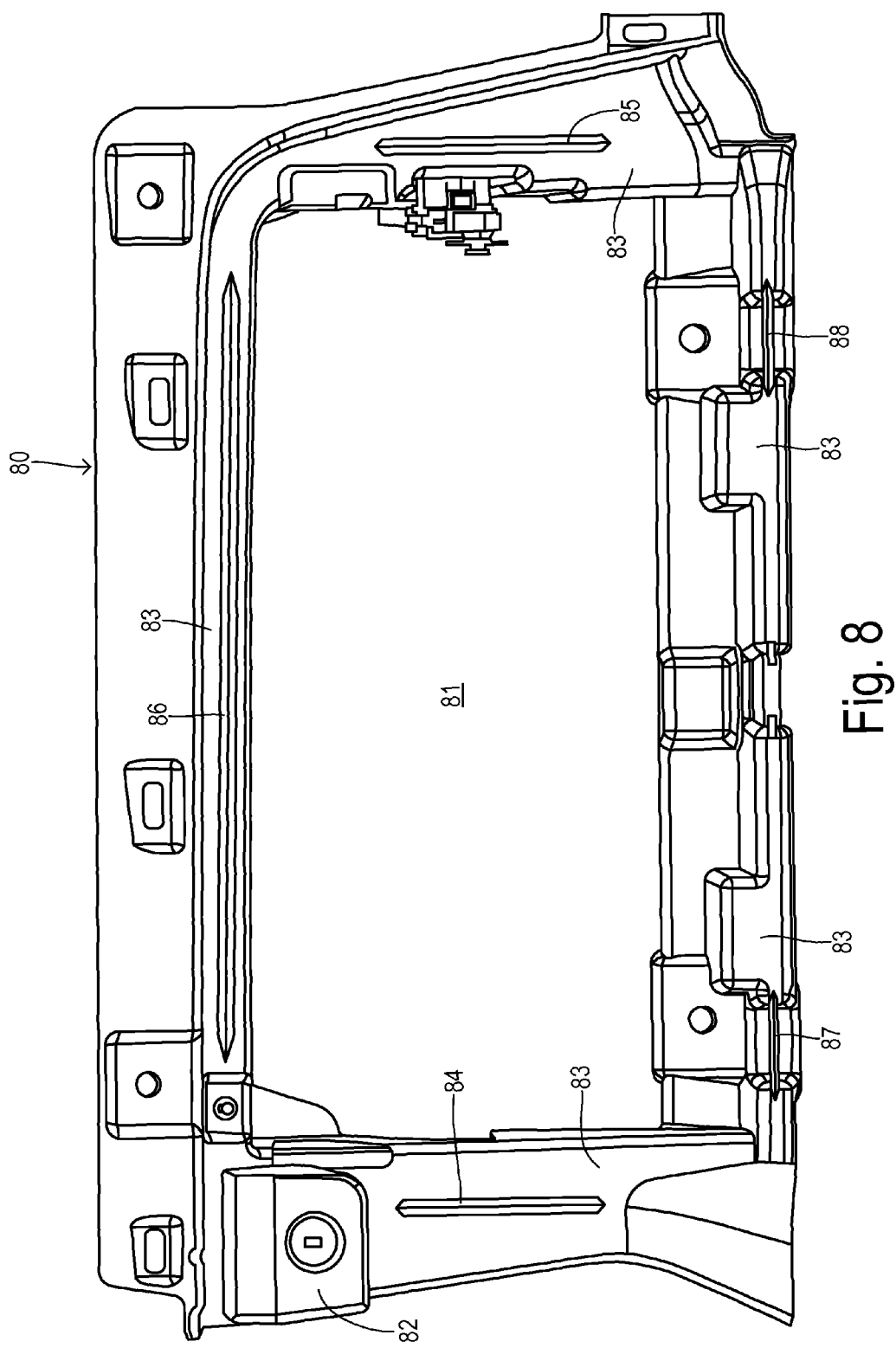
FIG. 8 is a plan view of one embodiment of a housing surround element for mounting to an instrument panel or dashboard as a glove box frame for defining a door opening.
Figure 9:
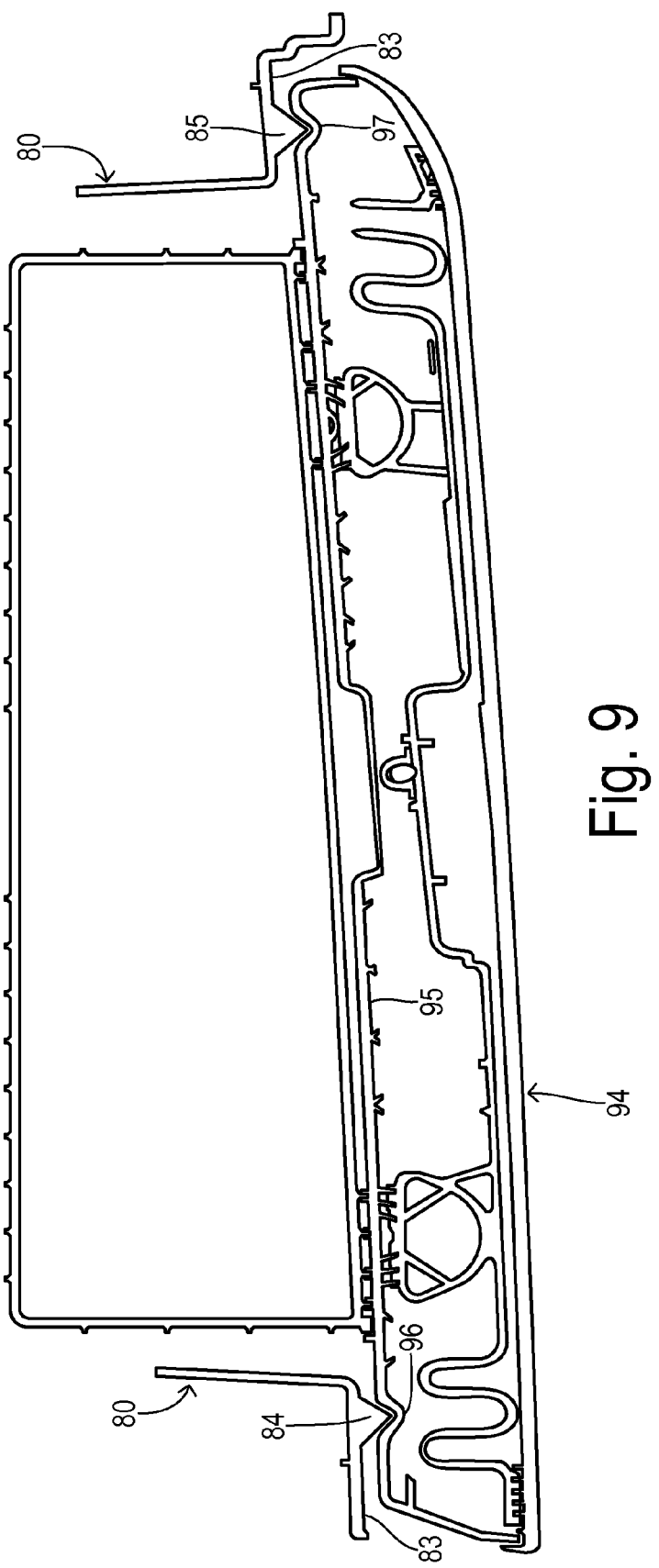
FIG. 9 is a horizontal cross-sectional view of an active glove box system with interlocking features between the housing and reaction wall at the lateral sides of the door opening.

Another embodiment of the interlocking features is shown in FIGS. 8-10 using matching pawls and detents at the interface between the door and housing. FIG. 8 shows a housing surround 80 acting as a glove box frame to be mounted to an instrument panel or dashboard. Housing 80 defines a door space 81 inside a curb flange 83 comprised of planar surfaces that receive an outer rear surface of a door. Housing 80 includes a latch receiver 82 for latching and locking of the door. In this embodiment, the matching pawls and detents preferably take the form of elongated channels and raised buyers that become interlocked when the door is closed. The pawls can be on the curb flange or on the door, with the matching channel being on the opposite surface. In the embodiment shown in FIGS. 8-10, raised bars 84, 85, and 86 are placed on the curb flange 83 at the left side, right side, and top edges, respectively. In addition, a portion of curb flange 83 along the bottom edge of housing 80 includes raised bars 87 and 88 for interlocking with matching channels on the door (not shown).

FIG. 9 is a top view of a horizontal cross section showing raised bars 84 and 85 projecting from curb flange 83. Each bar 84 and 85 has a triangular cross-section. A door 94 includes a reaction wall 95 having elongated channels 96 and 97 along an outer fringe surface at the left and right lateral sides for receiving raised bars 84 and 85, respectively. Channels 96 and 97 preferably have a matching triangular cross-section in order to provide smooth interlocking of bars 84 and 85 into channels 96 and 97 when door 94 is pivoted into the closed position. Due to the penetration of bars 84 and 85 into channels 96 and 97, they create interference against movement of reaction wall 95 along the inward perpendicular direction that would otherwise occur with submarining. FIG. 10 is a vertical cross section showing bar 86 on curb flange 83 and matching channel 99 formed in reaction wall 95.

Figure 11:
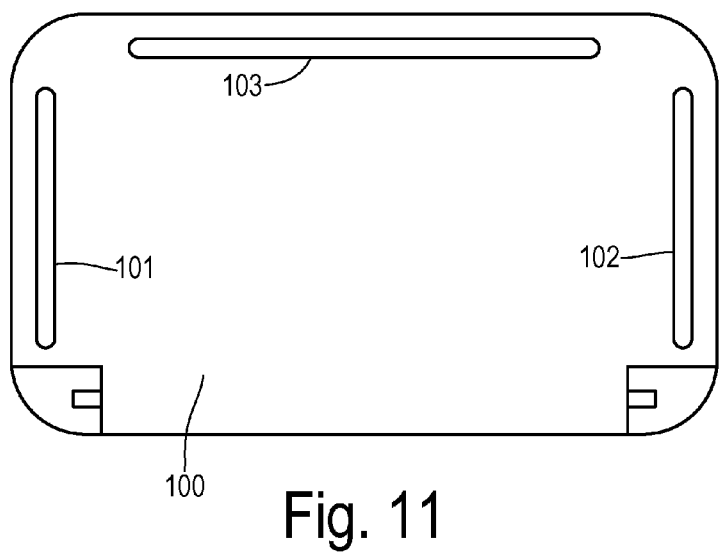
FIG. 11 is a rear, plan view of a reaction wall with interlocking features.

FIG. 11 is a rear plan view of a reaction wall 100. Interlocking features 101, 102, and 103 on wall 100 can be comprised of either elongated channels or raised bars placed along an outer fringe. The interlocking features can be continuous or discontinuous. They can be placed wherever corresponding spaces are not occupied by other features such as a latch or hinge. Placement may be determined in any particular embodiment as part of an overall design task with a goal of limiting the potential for submarining.

What is claimed is:

1. An active glove box system comprising:
    an instrument panel housing defining a door space bordered by a curb flange along top and lateral sides of the door space; and
    a glove box door comprising:
        a trim wall providing an outside trim surface of the door;
        a bladder wall sealed along an outer edge to the trim wall defining an inflatable cavity; and
        a reaction wall defining a back surface of the door, attached to the bladder wall, and having an outer fringe surface abutting the curb flange when the door is closed, wherein the housing and door are attached along a bottom side of the door space by a hinge;
    wherein the fringe surface and the curb flange comprise interlocking features configured to engage and disengage without resistance in a door opening direction and to provide interference against movement of the reaction wall along an inward perpendicular direction when engaged.

2. The system of claim 1 wherein the interlocking features are comprised of matching pawls and detents at each of the lateral sides of the curb flange and outer fringe surface.

3. The system of claim 1 wherein the interlocking features are comprised of a matching pawl and detent along the top of the curb flange and outer fringe surface.

4. The system of claim 1 wherein the interlocking features are comprised of matching pawls and detents, wherein each detent is an elongated channel, and wherein each pawl is a raised bar.

5. The system of claim 4 wherein the elongated channels and raised bars have triangular cross sections.

6. The system of claim 1 wherein the interlocking features are comprised of a plurality of pins extending from the reaction wall and mating bores formed in the curb flange.

7. The system of claim 1 wherein the trim wall, bladder wall, and reaction wall are comprised of molded thermoplastic.

8. The system of claim 1 wherein the door further comprises an inflator configured to supply inflation gas into the inflatable cavity during a crash event.

9. An automotive storage compartment comprising:
    a panel frame with a door opening; and
    a hinged door including a back panel, front panel, and internal bladder inflatable for deploying the front panel during a crash as a cushion;
    wherein a fringe surface of the back panel is received by a curb flange on the frame with an interlock that engages and disengages without resistance to provide interference against back panel movement along an inward perpendicular direction.

\* \* \* \* \*